(12) United States Patent
Astigarraga et al.

(10) Patent No.: US 10,291,709 B2
(45) Date of Patent: *May 14, 2019

(54) PROTOCOL INDEPENDENT STORAGE DISCOVERY AND ENABLEMENT

(71) Applicant: INTERNATIONAL BUSINESS MACHINES CORPORATION, Armonk, NY (US)

(72) Inventors: Tara Astigarraga, Fairport, NY (US); Christopher V. DeRobertis, Hopewell Junction, NY (US); Louie A. Dickens, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/969,160

(22) Filed: May 2, 2018

(65) Prior Publication Data

US 2018/0248952 A1  Aug. 30, 2018

Related U.S. Application Data

(63) Continuation of application No. 14/622,243, filed on Feb. 13, 2015, now Pat. No. 10,057,347.

(51) Int. Cl.
H04L 12/46  (2006.01)
H04L 29/08  (2006.01)
H04L 29/12  (2006.01)

(52) U.S. Cl.
CPC ...... *H04L 67/1097* (2013.01); *H04L 12/4641* (2013.01); *H04L 61/25* (2013.01); *H04L 61/6022* (2013.01)

(58) Field of Classification Search
CPC . H04L 67/1097; H04L 12/4641; H04L 61/25; H04L 61/6022

(Continued)

(56) References Cited

U.S. PATENT DOCUMENTS 6,208,649 B1  3/2001  Kloth
7,401,338 B1  7/2008  Bowen et al.

(Continued)

OTHER PUBLICATIONS

Nurmi, Daniel, et al. "The eucalyptus open-source cloud-computing system." Cluster Computing and the Grid, 2009. CCGRID'09. 9th IEEE/ACM International Symposium on. IEEE, 2009.

(Continued)

*Primary Examiner* — James E Springer
(74) *Attorney, Agent, or Firm* — ZIP Group PLLC (57) ABSTRACT

A manager node provides discovery, translation, and mapping services for supported Ethernet protocol layers. The manager node discovers other nodes within the cloud environment and issues commands to each of the discovered nodes to obtain storage device specific information associated to storage devices communicatively connected to the discovered nodes. The storage device information obtained may include such things as device function (initiator or target), device model number, device capacity, and available storage (free), etc. When the manager node has gathered the storage device specific information it may create a list of all feasible storage devices that could be utilized within the cloud environment. The manager node may determine which of the discovered storage devices will be enabled. Subsequently, the manager node map may serve as an address translator and/or a gateway between protocols.

20 Claims, 8 Drawing Sheets

(58) Field of Classification Search
USPC .......................................................... 709/217
See application file for complete search history.

(56) References Cited

U.S. PATENT DOCUMENTS

| | | | |
|---|---|---|---|
| 8,156,215 B2 | 4/2012 | Griswold et al. | |
| 8,205,000 B2 | 6/2012 | Chang et al. | |
| 8,307,048 B2 | 11/2012 | Brown et al. | |
| 8,621,051 B2 | 12/2013 | Agarwala et al. | |
| 8,849,955 B2 | 9/2014 | Prahlad et al. | |
| 9,118,495 B1 | 8/2015 | Hankins | |
| 9,491,035 B1 | 11/2016 | Pauley | |
| 10,057,347 B2 * | 8/2018 | Astigarraga | H04L 67/1097 |
| 2003/0208581 A1 | 11/2003 | Behren et al. | |
| 2004/0213220 A1 | 10/2004 | Davis | |
| 2006/0002311 A1 | 1/2006 | Iwanaga et al. | |
| 2009/0161692 A1 | 6/2009 | Hirata et al. | |
| 2010/0017497 A1 | 1/2010 | Brown et al. | |
| 2010/0265892 A1 | 10/2010 | Henry et al. | |
| 2011/0044344 A1 | 2/2011 | Hudson et al. | |
| 2012/0221789 A1 | 8/2012 | Felter | |
| 2013/0067090 A1 | 3/2013 | Batrouni et al. | |
| 2013/0097306 A1 | 4/2013 | Dhunay | |
| 2013/0204849 A1 | 8/2013 | Chacko | |
| 2013/0290399 A1 | 10/2013 | Gordon | |
| 2013/0326030 A1 | 12/2013 | Schmidt et al. | |
| 2015/0172156 A1 | 6/2015 | Lohiya et al. | |
| 2015/0334110 A1 | 11/2015 | Bishop | |
| 2017/0195344 A1 | 7/2017 | Astigarraga | |

OTHER PUBLICATIONS

Mell, Peter, et al. "The NIST Definition of Cloud Computing." Special Publication 800-145, Sep. 2011.
List of IBM Patents or Patent Applications Treated As Related, filed herewith.

* cited by examiner

PROTOCOL INDEPENDENT STORAGE DISCOVERY AND ENABLEMENT

FIELD OF THE INVENTION

Embodiments of the invention generally relate to data handling systems and more particularly to protocol independent storage discovery and enablement.

DESCRIPTION OF THE RELATED ART

When a computing workload is deployed in a cloud environment, it must be placed on computing resources within the cloud. However, in many instances the entirety of resources in the cloud environment is unknown. Most of the modern cloud protocols (Open Stack, Cloud Data Management Interface, etc.) make use of a wide variety of storage devices. Further, cloud protocols are not limited to a single storage type (block and/or file system). For example, Open Stack supports the following protocols: Fibre Channel, iSCSI, NFS, Scality, Shared SAS, Gluster FC. Such protocols typically utilize storage devices that are inventoried with storage device driver discovery processes. However, these discovery processes may not discover all storage devices available within the cloud environment.

SUMMARY

In an embodiment, a method for Ethernet protocol independent storage device discovery is presented. The method includes emulating, with a manager node, a plurality of undiscovered nodes within a network by broadcasting a plurality of data frames according to respective different Ethernet protocols to each of the plurality of undiscovered nodes. Each of the plurality of undiscovered nodes is operable within the network according to one Ethernet protocol upon being discovered by the manager node. The method further includes discovering one or more nodes, with the manager node, by receiving a reply frame from one or more of the undiscovered nodes. The method further includes requesting from the discovered one or more nodes, with the manager node, information associated with one or more storage devices communicatively connected to the discovered one or more nodes. The method further includes determining, with the manager node, whether to enable the one or more storage devices within the network.

In another embodiment, a computer program product for Ethernet protocol independent storage device discovery is presented. The computer program product includes a computer readable storage medium that has program instructions embodied therewith. The program instructions are readable to cause a manager node to emulate a plurality of undiscovered nodes within a network by broadcasting a plurality of data frames according to respective different Ethernet protocols to each of the plurality of undiscovered nodes. Each of the plurality of undiscovered nodes operable within the network according to one Ethernet protocol upon being discovered by the manager node. The program instructions are readable to cause a manager node to discover one or more nodes by receiving a reply frame from one or more of the undiscovered nodes. The program instructions are readable to cause a manager node to request from the discovered one or more nodes information associated with one or more storage devices communicatively connected to the discovered one or more nodes. The program instructions are readable to cause a manager node to determine whether to enable the one or more storage devices within the network.

In another embodiment, a data handling network is provided. The network includes a manager node and a plurality of undiscovered nodes communicatively connected to the manager node by a network. Each undiscovered node is communicatively connected to one or more storage devices and each undiscovered node operable within the network according to one Ethernet protocol upon being discovered by the management node. The management node emulates the plurality of undiscovered nodes by broadcasting a plurality of data frames according to respective different Ethernet protocols to each of the plurality of undiscovered cloud nodes, discovers one or more of the plurality of undiscovered cloud nodes by receiving a reply frame from one or more of the undiscovered cloud nodes, requests from the discovered one or more nodes information associated with one or more storage devices communicatively connected to the discovered one or more nodes, and determines whether to enable one or more storage devices within the network.

DETAILED DESCRIPTION

A reference cloud node, herein referred to a manager cloud node (CN) 10-A provides discovery, translation, and mapping services supported cloud protocol layers. The manager CN 10-A discovers other CNs 10 within the cloud environment 50 and issue 1 to N commands to each of the discovered CNs 10 to obtain storage device specific information associated to storage devices communicatively connected to the discovered CNs 10. Subsequently, the manager CN 10-A makes available the storage device information to make informed decisions whether an individual storage device should be enabled for utilization within the cloud environment 50.

The storage device information obtained may include such things as: device function (initiator or target), device model number, device capacity, and available storage (free), etc. When the manager CN 10-A has gathered and compiled the storage device specific information it makes available to a management application 95 upon one or more CNs 10 a list of all feasible storage devices 15 that could be utilized within the cloud environment 50 for either temporary or long term storage. Utilizing the list of feasible storage devices 15, the management application 95 determines which of the discovered storage devices 15 will be enabled for usage within the cloud environment 50. After storage device 15 selection has been completed by the management application 95, the manager CN 10-A serves as an address translator and a gateway between protocols.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
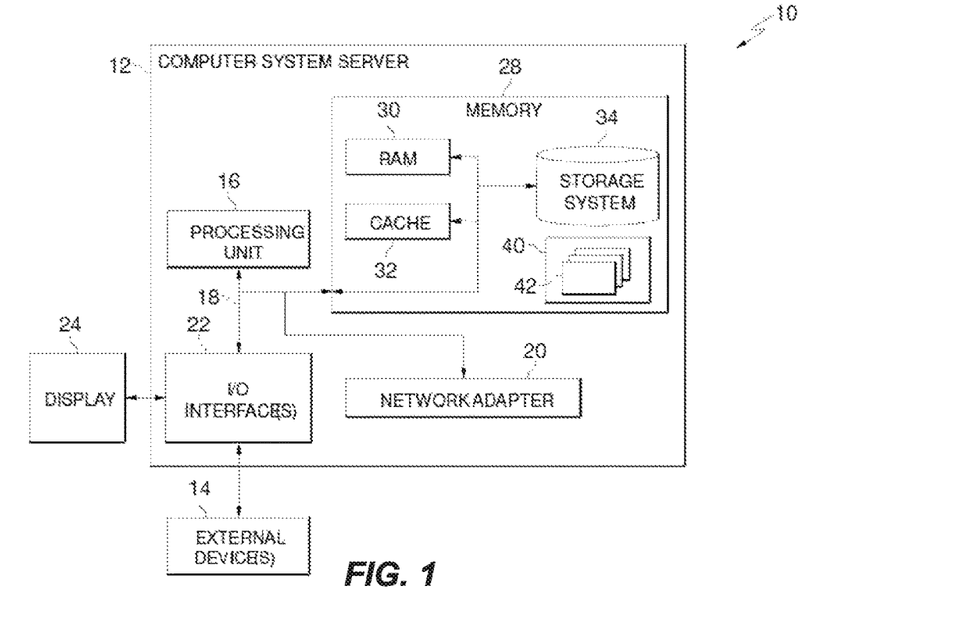
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, network devices such as switches, routers, etc., and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. In particular embodiments described herein computer system/server 12 communicates with external storage system or devices 15. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Storage system or device 15 may be external disk drive arrays, RAID systems, tape drives, and data archival storage systems, etc. and may be communicatively coupled to computer system/server 12 via I/O interfaces 22, network adapter 20, etc. Storage system or device 15 can further be a magnetic disk drive, an optical disk, flash memory device, tape memory device, etc.

Figure 2:
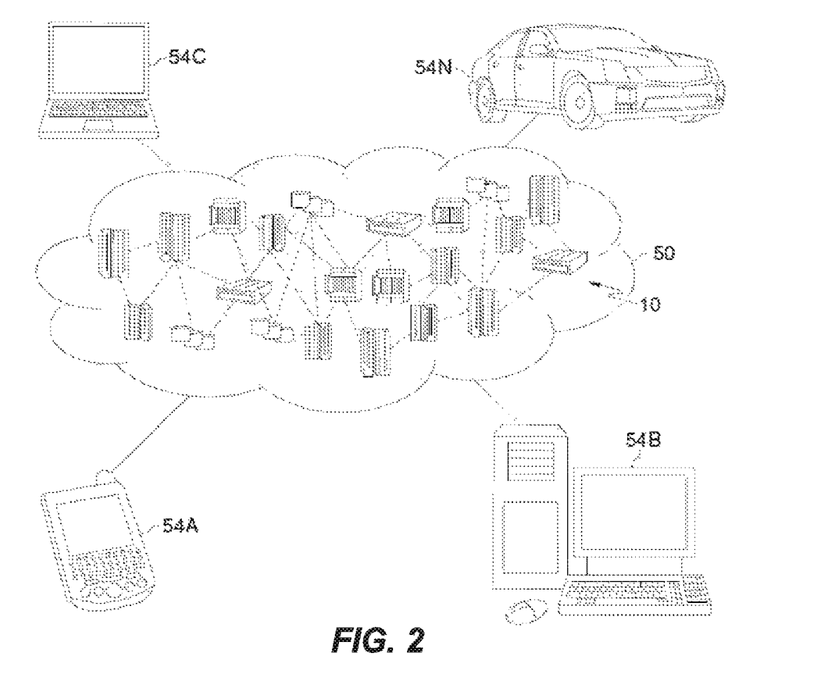
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
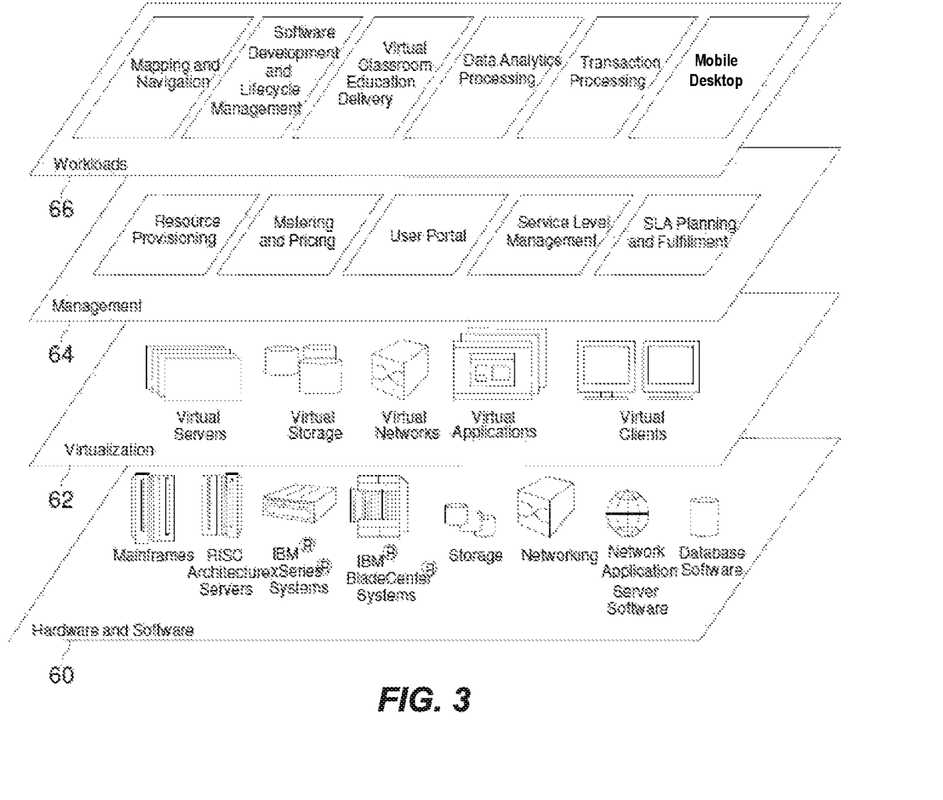
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; storage devices; networks and networking components. Examples of software components include network application server software, in one example IBM Web Sphere® application server software; and database software, in one example IBM DB2® database software. (IBM, zSeries, pSeries, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; mobile desktop.

Figure 4:
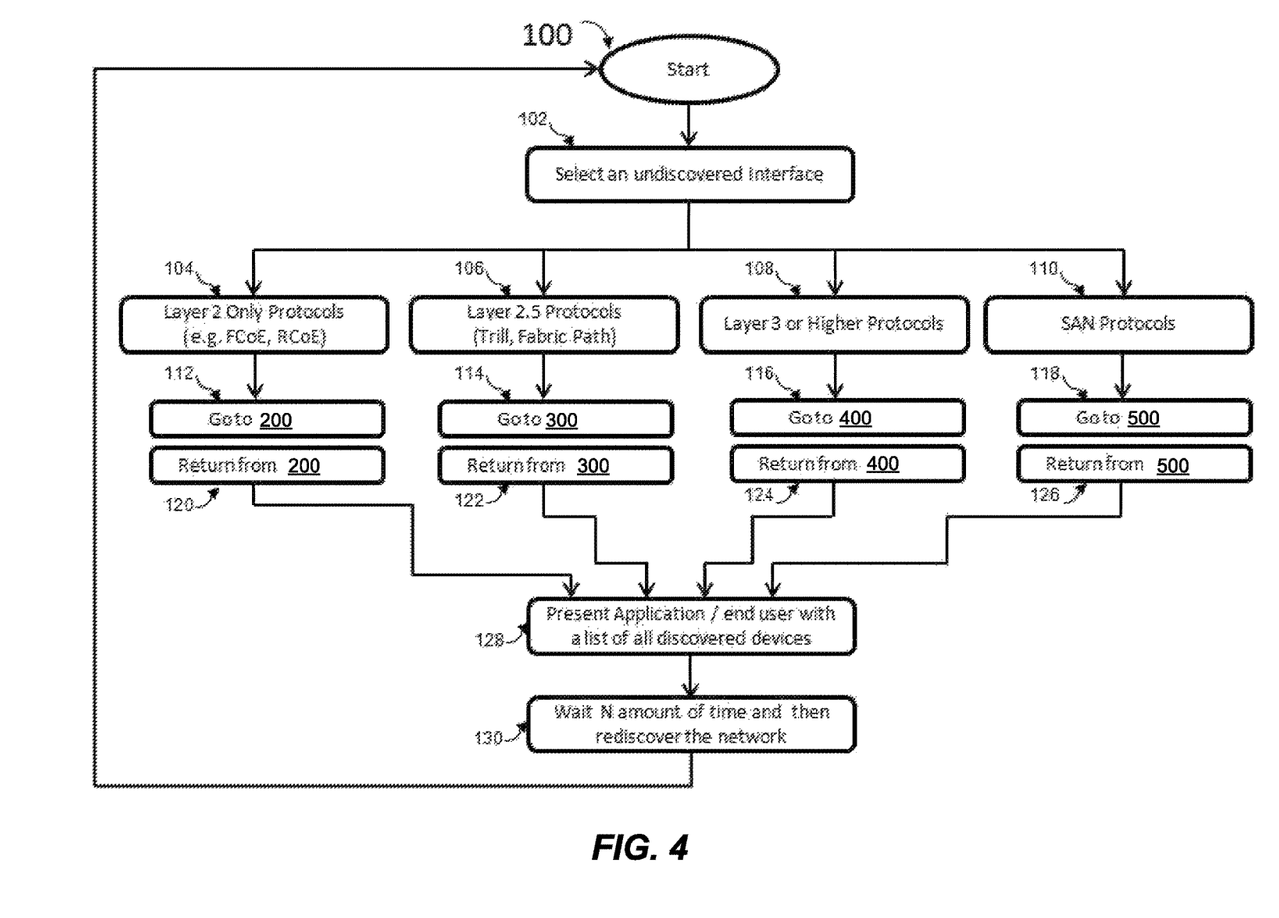
FIG. 4 depicts a process for protocol independent discovery of storage devices within a cloud environment according to an embodiment of the present invention.

FIG. 4 depicts a process 100 for protocol independent discovery of storage devices 15 within a cloud environment 50, according to an embodiment of the present invention. Process 100 begins at block 102 where an undiscovered interface is selected by the manager CN 10-A. An undiscovered interface is a cloud environment 50 that has not been discovered in a current iteration of process 100. For example, in a first process 100 iteration, CNs 10 within the Layer 2 protocol of cloud environment 50 are discovered. Layer 2 is deemed a discovered interface while Layer 2.5, Layer 3 or higher, and SAN protocols are undiscovered interfaces. In a second process 100 iteration, CNs 10 within the Layer 2.5 protocol of cloud environment 50 are discovered. Layer 2.5 is deemed a discovered interface while Layer 2, Layer 3 or higher, and SAN protocols are undiscovered interfaces.

Figure 5:
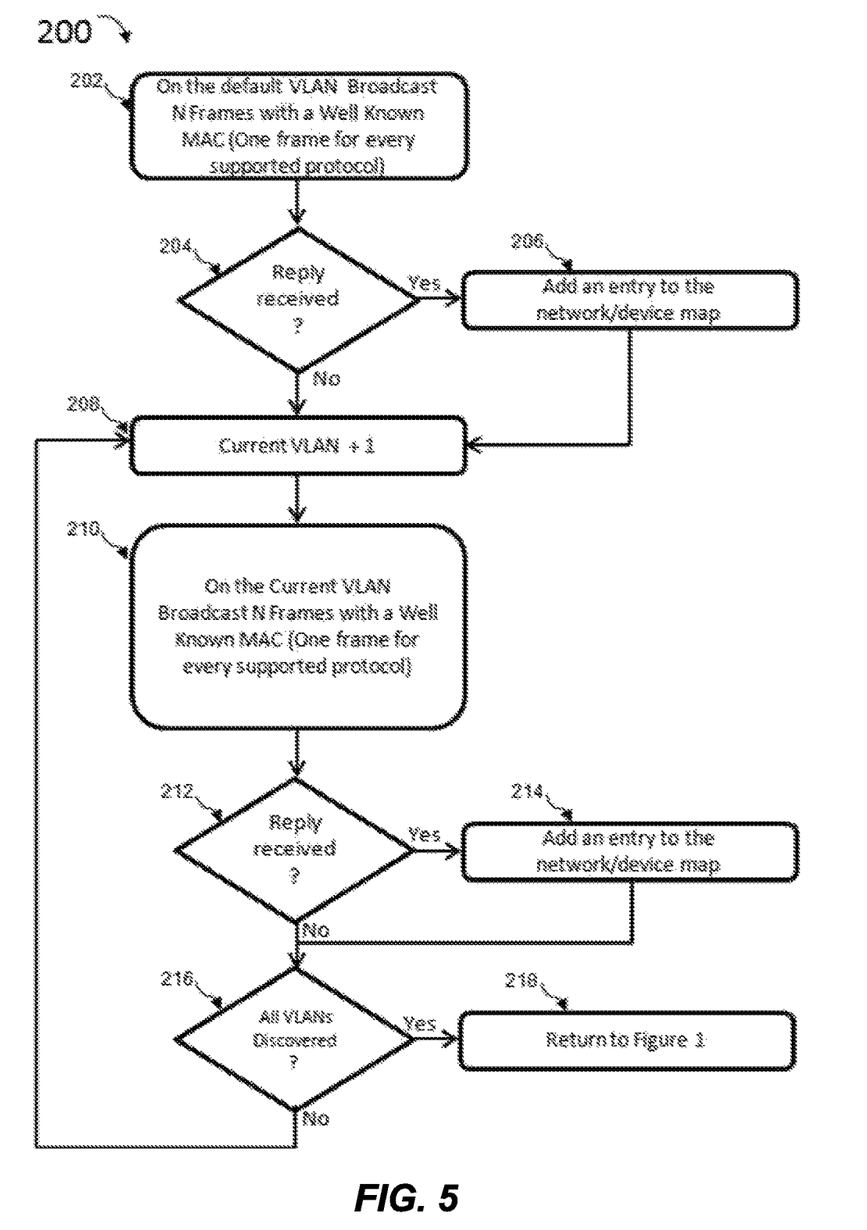
FIG. 5-FIG. 8 depict processes for specific protocol discovery of storage devices within a cloud environment according to an embodiment of the present invention.
Figure 6:
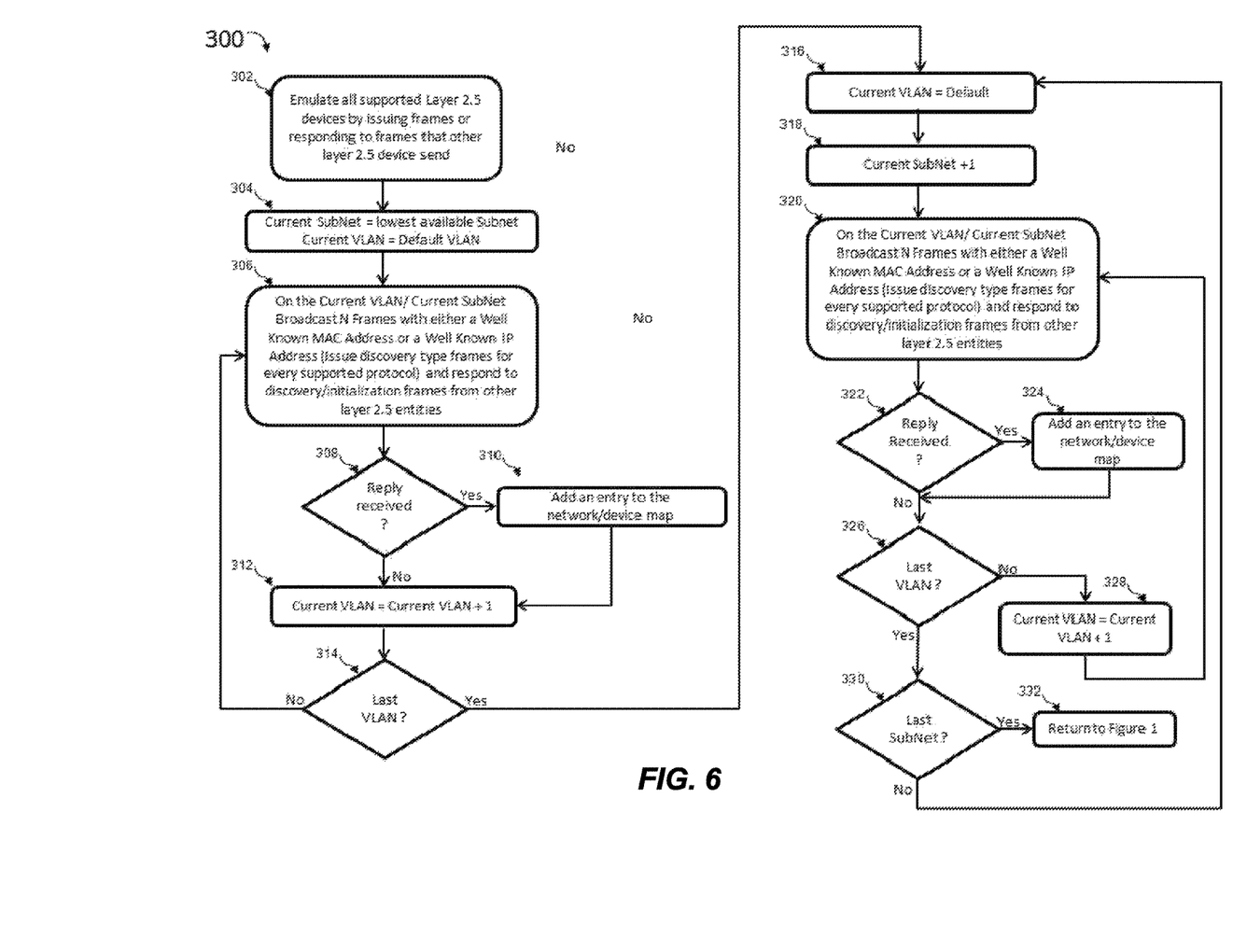

At block 104, CNs 10 within the Layer 2 protocol are discovered by process 200. Flow transfers from process 100 to process 200 at block 112 and returns from process 200 to process 100 at block 120. At block 106, CNs 10 within the Layer 2.5 protocol are discovered by process 300. Flow transfers from process 100 to process 300 at block 114 and returns from process 300 to process 100 at block 122. A layer 2.5 protocol is a protocol that includes both CNs 10 within the Layer 2 protocol and one or more other CNs 10 that provide Layer 3 services to the Layer 2 CN 10.

Figure 7:
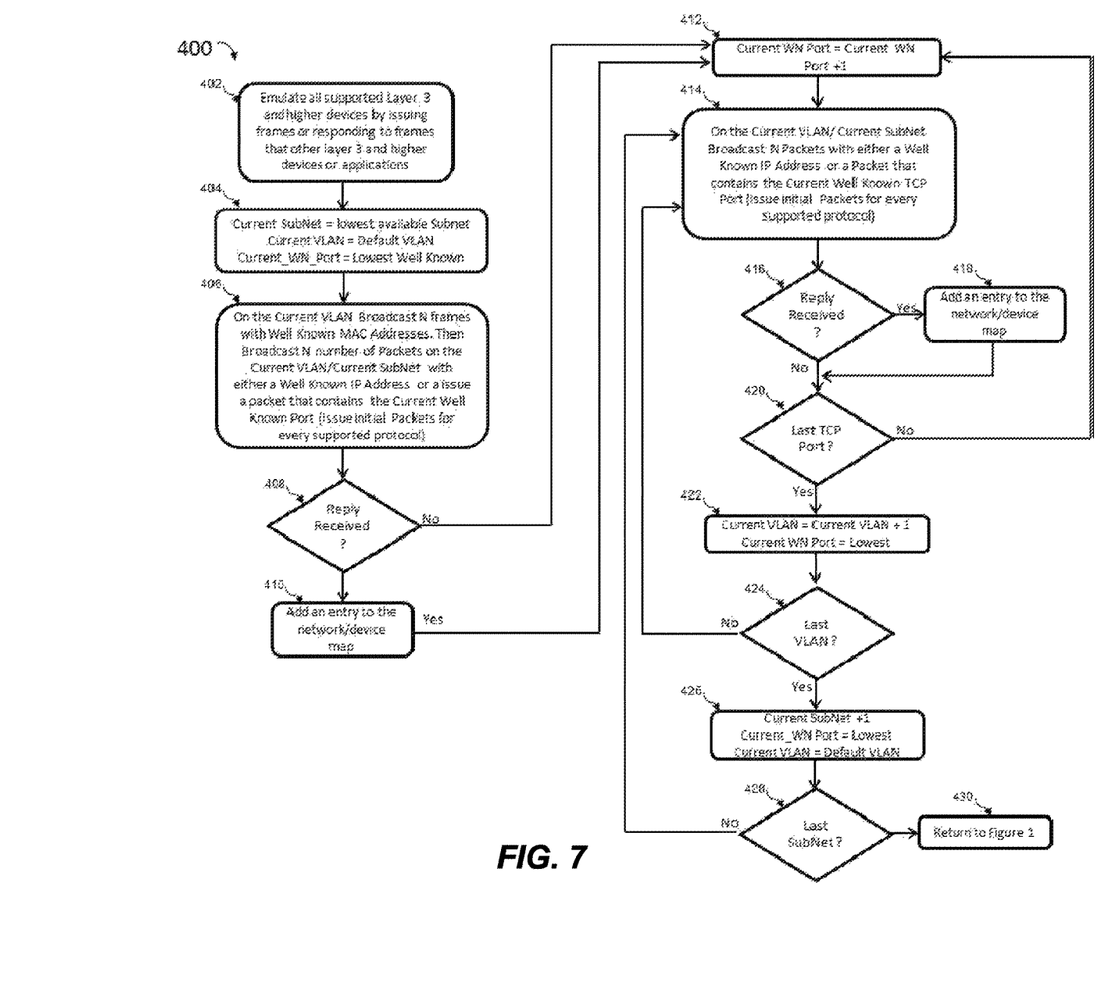
Figure 8:
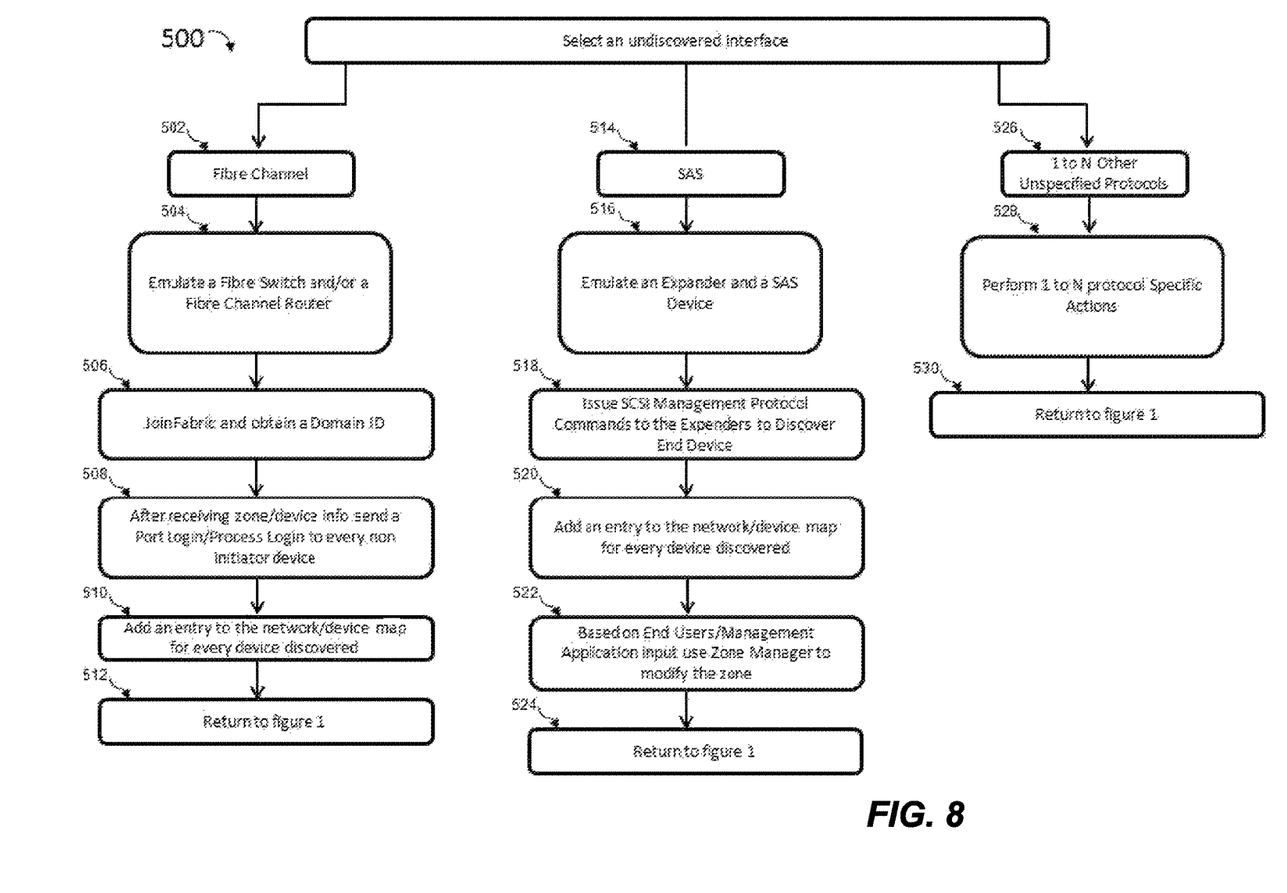

At block 108, CNs 10 within Layer 3 or higher protocol are discovered by process 400. Flow transfers from process 100 to process 400 at block 116 and returns from process 400 to process 100 at block 124. At block 110, CNs 10 within a SAN protocol are discovered by process 500. Flow transfers from process 100 to process 500 at block 118 and returns from process 500 to process 100 at block 126.

At block 128 a list of storage devices 15 discovered utilizing processes 200, 300, 400, and/or 500, respectively, are provided to an end user or to a management application 95. Application 95 may include user interface provided by e.g., display 24. A user may engage with the application 95. In embodiments, the application 95 may be preprogramed to determine which of those discovered storage devices 15 may be deployed for utilization within cloud environment 50. In other embodiments, the user may select which of those discovered storage devices 15 should be deployed for utilization within cloud environment 50. At block 130, after a threshold time, one or more iterations of process 100 are repeated. For example, one or more iterations of process 100 may occur every minute, day, week, month, etc. to discover storage devices 15 within the cloud environment 50.

FIG. 5 depicts a process 200 for discovery of storage devices 15 communicatively connected to CNs 10 within Layer 2 of cloud environment 50. Layer 2 switching uses the media access control address (MAC address) from the CN 10 network adapter 20 to decide where to forward frames. CN 10 utilizing Layer 2 switching include e.g., application-specific integrated circuit (ASICs), processing unit 16, etc. to build and maintain filter tables (also known as MAC address tables).

When a frame is broadcast, every device that is reachable via a Layer 2 MAC Address receives a copy of the frame. Layer 2 also employs a Well Known MAC addresses process. A Layer 2 Well Known MAC Address is a MAC address that is associated with a specific behavior. For example, there is a Well Known MAC Address defined by a protocol segment called Spanning Tree. CN 1Os that support the Spanning Tree Protocol perform the Spanning Tree operation specified in frames they receive with a Well Known MAC Address in the Destination MAC Address field.

At block 202, the manager CN 10-A broadcasts 1 to N frames in a default VLAN (virtual local area network) within a Layer 2 protocol segment with Well Known MAC Addresses. The contents of the frames may be protocol segment specific. The goal of these frames is to find CNs 10 in the Layer 2 protocol segment that are supported. Generally, these frames will be the initial frames for the specific protocol segment. For example, the first thing a CN 10 that supports the Spanning Tree protocol does after power up is Broadcast a Hello frame with it name as the root bridge. When this frame is received by the other CN 10 that support the Spanning Tree protocol, they initiate the Spanning Tree convergence process. Thus, the manager CN 10-A is able to determine or discover the other CNs 10 that are reachable so that it may start probing for storage devices 15.

At block 204, the manager CN 10-A monitors for incoming reply frames. At block 206, if a frame is received for a protocol segment that is supported by the manager CN 10-A, the manager CN 10-A records the information from the frame in a network device map 70. For example, the manager CN 10-A records information about the one or more discovered CN 10s in one or more cloud node entries 80. The cloud node entry 80 contains information about the discovered CN 10, which includes addressing information (MAC Address) or other CN 10 identifiers, etc. Once the identifier of the discovered CN 10 is known, the manager CN 10-A issues 1 to N additional requests to probe for storage devices 15 communicatively connected to the discovered CN 10 and to obtain storage device 15 specific information, which may include information such as, storage device type, protocol supported, amount of free or available storage, etc. Such storage device specific information may be entered into the network map 70 in one or more storage device entries 90.

At block 208, if a reply frame is not received, a variable that contains information about which VLAN frames to be broadcast is incremented. In other words, a next VLAN, protocol segment, etc. is set. At block 210, the manager CN 10-A broadcasts 1 to N frames in the Current VLAN (i.e., the next VLAN, etc.) with Well Known MAC Addresses. The contents of the frames may be protocol segment specific. The goal of these frames is to find CNs 10 in the Layer 2 protocol segment that support the specific protocol segment. Generally these frames will be the initial frames for the specific protocol segment.

At block 212, the manager CN 10-A monitors for incoming reply frames. At block 214, if a reply frame is received within the protocol segment that is supported by the manager CN 10-A, the manager CN 10-A records the information from the frame in network map 70. For example, the manager CN 10-A records information about the one or more discovered CN 10s in one or more cloud node entries 80. Once the identifier of the discovered CN 10 is known, the manager CN 10-A issues 1 to N additional requests to probe for storage devices 15 communicatively connected to the discovered CN 10 and to obtain storage device specific information. Such storage device specific information may be entered into the network map 70 in one or more storage device entries 90.

At block 216, if a reply frame is not received, a check is made to see if all possible VLAN have been discovered (i.e., the maximum number possible is 4096). If not all possible VLANs have been discovered flow returns to block 208 where applicable VLAN is incremented and associated broadcast process of block 210 occurs. At block 218, if all VLANs have been discovered, flow continues to block 120.

In this manner, the manager CN 10-A emulates Layer 2 nodes by iteratively broadcasts across Layer 2 protocol segments to find other Layer 2 CNs 10 within cloud environment 50. Once found, the manager CN 10-A adds an associated entry 80 to map 70 and sends additional requests to the discovered CNs 10 to obtain further storage device information such as, storage device type, protocol supported, amount of free or available storage, etc.

FIG. 6 depicts a process 300 for discovery of storage devices 15 communicatively connected to CNs 10 within Layer 2.5 of cloud environment 50. Layer 2.5 is a multilayer switching which combines layer 2 and layer 3 switching technologies. For example, process 300 utilizes Layer 2 Broadcasting, Layer 2 Well Known MAC Addresses, Layer 3 Well Known Addresses, and Layer 3 Broadcasting (IPv4) \Multicasting(IPv6). Frames are given either a Well Known Layer 2/3 Addresses and are then broadcasted or multicasted. Various Standards (e.g., Transparent Interconnection of Lots of Link, etc.) have defined a set of Well Known Layer 3 Addresses.

At block 302, the manager CN 10-A emulates known and/or supported Layer 2 and Layer 3 devices. This will enable it to find CNs 10 within environment 50 utilizing Layer 2 switching and find one or more CNs 10 that provide Layer 3 services to the Layer 2 CNs 10. At block 304, variables are initialized to their starting values. For instance, Current Subnet is set to the lowest available Subnet and Current VLAN is set to a default VLAN.

At block 306, the manager CN 10-A broadcasts 1 to N frames in the default VLAN in the Current Subnet with a Layer 2 Well Known MAC Address in the Destination MAC Address field. In addition, the CN 10-A broadcasts 1 to N Packets in the default VLAN in the Current Subnet with Well Known Layer 3 Addresses in the Layer 3 Destination Address field. The contents of the frames and packets are be protocol segment specific. Generally, the frames/packets to be broadcast are the initial frames for the specific protocol segment. For example, the first thing a device that supports the Transparent Interconnection of Lots of Links (TRILL) protocol does after powering up is broadcast a TRILL Hello. When this frame is received by the other devices that support TRILL they begin the TRILL initialization process. Thus, the CN 10-A will be able to discover the Layer 2 CNs 10 and CNs 10 that provide Layer 3 services to the Layer 2 CNs 10.

At block 308, the manager CN 10-A monitors for incoming frames and/or packets. At block 310, a frame/packet has been received and the contents are examined. If the received frame/packet contains information about a protocol segment that the manager CN 10-A supports, the that the manager CN 10-A adds an entry 80 in the network map 70. The entry 80 contains information about the discovered CN 10, which may include addressing information (MAC Address/Layer 2.5 or Layer 3 Address), other identifying information, etc.

At block 310, once the address or identify of the CN 10 is known, the manager CN 10-A issues 1 to N additional requests/commands to the discovered CN 10 to obtain storage device specific information associated with storage devices 15 communicatively coupled thereto. The storage device specific information may be e.g., device type, protocol supported, amount of free or available storage.

At block 312, the variable that contains information about which VLAN frames/packets will be broadcast upon is incremented. At block 314, a check is made to determine if the current VLAN=4065, or in other words, the last VLAN. If the current VLAN is not the last VLAN, flow returns to block 306 where the manager CN 10-A discovers storage devices 15 connected to CNs 10 within the current VLAN, with applicable broadcast, reply, and probing techniques. Resulting storage device information may be recorded in one or more entries 90.

At block 316, if the current VLAN is the last VLAN, the variable Current VLAN is set back to the default VLAN. At block 318, the Current Subnet is incremented by one. At block 320, the manager CN 10-A broadcasts 1 to N frames in the default VLAN in the Current Subnet with a Layer 2 Well Known MAC Address in the Destination MAC Address field, and 1 to N Packets are Broadcasted in the default VLAN in the Current Subnet with Well Known Layer 3 Addresses in the Layer 3 Destination Address field. Once again, the contents of the frames and packets are protocol segment specific.

At block 322, the manager CN 10-A monitors for incoming reply frames and packets and at block 324, when a reply frame/packet has been received, the contents are examined. If the received frame/packet contains information about the protocol segment that the CN 10-A supports, the CN 10-A records the information in a database entry 80 and issues 1 to N additional requests/commands to obtain storage device 15 specific information. Resulting storage device information may be recorded in one or more entries 90.

At block 326, it is determined whether the current VLAN is the last VLAN. If it is the last VLAN, flow continues to block 330, otherwise flow continues to block 328. At block 328, the Current VLAN variable is incremented by one and processing starts on the current VLAN by returning to block 320. At block 330, it is determined if this the current SubNet is the last SubNet. If the current SubNet is the last Subnet, flow continues to block 332, otherwise flow returns to block 316, where the VLANs in the new subnet will are processed. At block 332, Layer 2.5 processing is complete and flow returns to block 122.

In this manner, the manager CN 10-A emulates Layer 2.5 nodes by iteratively broadcasts applicable VLANs and Subnets to find CNs 10 in the associated Layer 2.5 segment. Once found, the managing CN 10A adds an associated entry 90 to map 70 and sends additional requests to the discovered CNs 10 to obtain further storage device information such as, storage device type, protocol supported, amount of free or available storage, etc. This storage device information may be recorded in one or more entries 90 within the map 70.

FIG. 7 depicts a process 400 for discovery of storage devices 15 communicatively connected to CNs 10 within Layer 3 or higher of cloud environment 50. Process 400 utilizes Layer 2 Broadcasting, Layer 2 Well Known MAC Address, Well Known IP Addresses, Well Known Ports, and Layer 3 Broadcasting/Multicasting.

Layer 3 Broadcasting(IPv4)/Multicasting(IPv6) uses Well Known IP Addresses to send frames throughout the network. Once a CN 10 has been discovered the manager CN 10-A then discovers the all of the storage devices 15 communicatively coupled to the discovered CN 10 using the storage devices 15 Layer 3 address and all of the various Well Known Ports. Various Standards (e.g., Internet Protocol, etc.) have defined a set of Well Known Layer 3 Addresses. The manager CN 10-A emulates all known and/or supported Layer 2 and Layer 3 devices. This will enable the CN 10-A to find all of the Layer 2 and/or Layer 3 CNs 10 in the Layer 2 and all of the Layer 3 CNs 10 in the network. Generally, the frames/packets to be Broadcasted/Multicasted will be the initial frames for the specific protocol. For example, Layer 3 routers that support the open shortest path first (OSPF) routing protocol broadcast a Hello frame with a Well Known Layer 3 Address in the Destination Layer 3 Address field. When this frame is received by the other CNs 10 that support OSPF they begin the OSPF initialization process. Thus, the manager CN 10-A will be able to determine the Layer 2 and 3 CNs 10 that are reachable and then it may probe for storage devices 15.

At block 402, the manager CN 10-A emulates CNs 10 within Layer 3 or higher by broadcasting frames accordingly herein described. This will enable the manager CN 10-A to find other CNs 10 within Layer 3 or higher within cloud environment 50. At block 404, variables are initialized to respective starting values. For example, Current Subnet is set to the lowest available Subnet, Current VLAN is set to a default VLAN, and Current WN Port is set to the lowest well known port.

At block 406, the manager CN 10-A broadcasts 1 to N frames in the default VLAN in the Current Subnet with Layer 2 Well Known MAC Address in the Destination MAC Address field. In addition, the manager CN 10-A broadcasts 1 to N Packets are Broadcasted in the default VLAN in the Current Subnet with Well Known Layer 3 Addresses in the Layer 3 Destination Address field. The contents of the frames and packets may be protocol specific. In other words, initial Packets are broadcasted for each supported protocol segment.

At block 408, the manager CN 10-A monitors for incoming reply frames and packets. At block 410, when a frame/packet has been received, the contents are examined. If the received frame/packet contains information about a protocol that the manager CN 10-A supports, the CN 10-A records the discovered CNs 10 information the network map 70 by making an entry 80. The entry 80 may contains information about the discovered CNs 10 which may include addressing information (e.g., MAC Address, Layer 3 Address, etc.).

At block 412, once the address of the CNs 10 are known, the manager CN 10-A issues 1 to N additional requests/commands to obtain information regarding storage devices 15 communicatively connected to the discovered CNs 10. The storage device specific information may include information such information as, device type, protocol supported, amount of free or available storage, etc. The manager CN 10-A may record the storage device information within map 70 by making one or more entries 90. At block 412, the variable that contains information about which Well Known Ports packets will be issued is incremented by one such that the CN 10-A iteratively broadcasts initial packets for each supported protocol.

At block 414, the manager CN 10-A unicasts 1 to N packets in the default VLAN in the Current Subnet with a Layer 3 Addresses of an CN 10 that has been discovered in the Layer 3 Destination Address field and the port field is set to the Current WN Port. For clarity, 1 to N packets containing a Well Known Port number will be sent to each of the discovered CN 10, wherein in the present case, N equals the number of supported Well Known Ports.

At block 416, the manager CN 10-A monitors for incoming reply frames and packets. At block 418, when a frame/packet has been received, the contents are examined. If the received frame/packet contains information about a protocol that the CN 10-A supports, the CN 10-A records the information the network ma 70 by making an cloud node entry 80. The entry 80 may contains information about the recipient, which includes addressing information (e.g., MAC Address, Layer 3 Address, etc.).

At block 420, it is determined whether the Current WN Port (Well Known Port) contains one of the following values: 1) last Well Known Port or, 2) Last Supported Well Known Port. If affirmative, flow continues to block 422, otherwise flow returns to block 412 where the Current WN Port is incremented.

At block 422, the variable Current VLAN is incremented by one and the variable Current WN Port is reset to the lowest Well Known Port. At block 424, if the Current VLAN value equals 4065, or the last VLAN, flow continues to block 426, otherwise flow returns to block 414.

At block 426, the Well Known ports have been discovered in all of the VLANs in the Current Subnet. As such, the Current Subnet variable is incremented by one and the Current VLAN and Current WN Port variable as reset to their lowest (i.e., starting) values. At block 428, it is determined whether the Current Subnet variable equals the last defined/available Subnet. If affirmative, then all Ports have been discovered in each of the VLAN in each of the SubNets, and flow continues to block 430, otherwise flow returns to block 414 where all of the Well Known ports in each of the VLANs in the Current Subnet are discovered. At block 430, flow returns to block 124.

In this manner, the manager CN 10-A emulates Layer 3 or higher nodes by iteratively broadcasts to VLANs, Subnets, and Ports to find CNs 10 within Layer 3 or higher segments of cloud environment 50. Once found, the managing CN 10A adds an associated entry 90 to map 70 and sends additional requests to the discovered CNs 10 to obtain further storage device information such as, storage device type, protocol supported, amount of free or available storage, etc. This storage device information may be recorded in one or more entries 90 within the map 70.

FIG. 8 depicts a process 500 for discovery of storage devices 15 communicatively connected to CNs 10 by a storage area network (SAN) within cloud environment 50. Process 500 includes discovery techniques for SAN protocols, such as, Fibre Channel, SAS, etc. At block 502 discovery of CNs 10 utilizing a Fibre Channel interface is commenced. At block 504, the CN 10-A emulates a Fibre Channel CN 10, such as a Fibre Channel switch or Fibre Channel router. At block 506, the CN 10-A joins the Fibre Channel fabric and obtains a Fibre Channel Domain identifier.

At block 508, the CN 10-A receives zone or CN 10 information and sends a Port Login/Process Login to the CNs 10 (e.g., non-initiator Fibre Channel devices, etc). At block 510, for those CN 10 that are discovered, an entry 80 is added to the network map 70 and at block 512, flow returns to block 126. Additional commands or requests are sent by CN 10-A to the discovered Fibre channel CN 10s to probe for storage device specific information. The storage device specific information may be added to map 70 with one or more entries 90.

At block 514 discovery of CNs 10 utilizing a SAS interface is commenced. At block 516, the CN 10-A emulates a SAS CN 10, such as a SAS expander or other SAS device. At block 518, to discover the SAS CNs 10, the CN 10-A issues SCSI Management Protocol Commands to the SAS CNs 10. At block 520, for those CNs 10 that are discovered, an entry 80 is added to the network map 70. The CN 10-A may send additional commands or requests to the discovered SAS CNs 10 for storage device specific information from storage devices 15 communicatively connected to the discovered SAS CNs 10. The storage device specific information may be added to map 70 by one or more entries 90. At block 522, based upon director from or input to management application 90, the SAS zone may be modified and at block 524 and flow returns to block 126. Similar techniques may be utilized by the CN 10-A to emulate and discover another SAN CN 10 (block 526) and to discover storage devices 15 communicative connected to the SAN CNs 10 and adding storage device specific information to the network device map 70 (block 528) where, in turn, flow returns to block 126.

Figure 9:
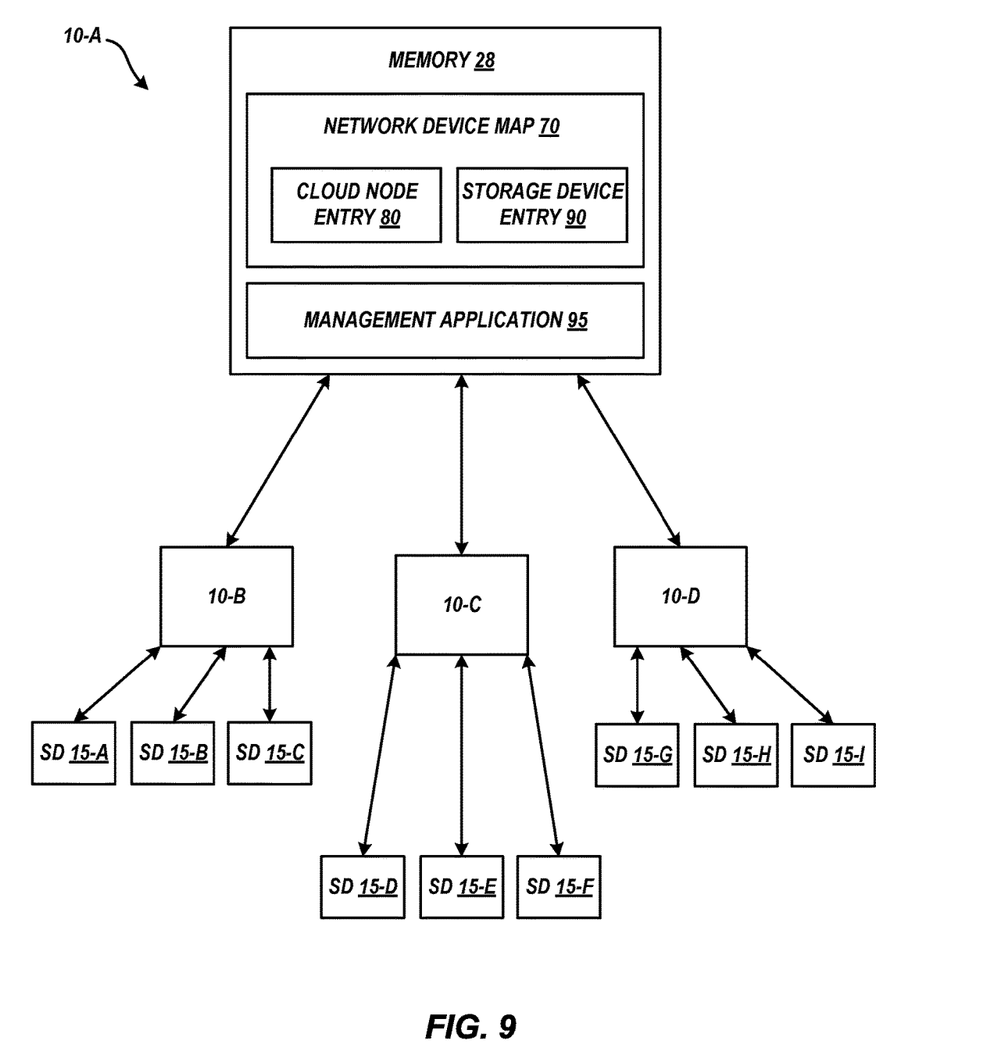
FIG. 9 depicts a cloud computing environment according to an embodiment of the present invention.

FIG. 9 depicts an exemplary cloud environment 50 that utilizes Ethernet and Internet protocols for operation. The Ethernet protocol is composed of layers 1 through 7 and each of these layers provides one or more unique functions to the protocol. It is the purpose of manager CN 10-A to discover and use storage devices 15 that would be undiscoverable utilizing known techniques. In embodiments, the manager CN 10-A may blend functionalities of a network device (e.g., switch and router) with the function of a SAN switch and SAN adapter card. The manager CN 10-A provides discovery, translation, and mapping services supported cloud protocol layers. The manager CN 10-A discovers other CNs 10B, 10C, and 10D within the cloud environment 50 by emulating layer 1-layer 7 CNs 10 and sending frames or packets to the CNs 10B, 10C, and 10D for their relative discovery. The manager CN 10-A issues 1 to N commands to each of the discovered CNs 10A, 10B, and 10D to obtain storage device specific information associated to storage devices 15 (i.e. 15-A-15-I) communicatively connected to the discovered CNs 10A, 10B, and 10C. Subsequently, the manager CN 10-A makes available the storage device information to a management application 95 running on one or more CNs 10 to make informed decisions whether an individual storage device 15 should be enabled for utilization within the cloud environment 50. The application 95 may dynamically add the storage device(s) 15 to be utilized by other CNs 10 within cloud environment 50 either on a permanently or temporally basis.

The storage device information obtained may include such things as: device function (initiator or target), device model number, device capacity, and available storage (free), etc. When the manager CN 10-A has gathered and compiled the storage device specific information it makes available to a management application 95 upon one or more CNs 10 a list of all feasible storage devices 15 that could be utilized within the cloud environment 50 for either temporary or long term storage. Utilizing the list of feasible storage devices 15, the management application 95 determines which of the discovered storage devices 15 will be enabled for usage within the cloud environment 50. After storage device 15 selection has been completed by the management application 95, the manager CN 10-A serves as an address translator and a gateway between protocols. For example, CN 10-B may utilize storage device 15-G via manager CN 10-A subsequent to application 95 enabling storage device 15-G within cloud environment 50.

Embodiments of the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method for Ethernet protocol independent storage device discovery comprising:
    emulating, with a manager node, a plurality of undiscovered nodes within a network by broadcasting a plurality of data frames according to respective different Ethernet protocols to each of the plurality of undiscovered nodes, each of the plurality of undiscovered nodes operable within the network according to one Ethernet protocol upon being discovered by the manager node;
    discovering one or more nodes, with the manager node, by receiving a reply frame from one or more of the undiscovered nodes;
    requesting from the discovered one or more nodes, with the manager node, information associated with one or more storage devices communicatively connected to the discovered one or more nodes; and
    determining, with the manager node, whether to enable the one or more storage devices within the network.

2. The method of claim 1, further comprising:
    logging, with the manager node, information associated with one or more nodes within a network device map stored within the manager node.

3. The method of claim 1, further comprising:
    enabling, with the manager node, the one or more storage devices within the network; and
    mapping, with the manager node, the enabled one or more storage devices to an associated discovered one or more nodes, wherein the mapping allows the associated discovered one or more nodes to utilize the enabled one or more storage devices.

4. The method of claim 1, wherein emulating the plurality of nodes further comprises:
    emulating a Layer 1 node by broadcasting a plurality of frames each comprising a Well Known MAC Address upon each virtual local area network (VLAN).

5. The method of claim 1, wherein emulating the plurality of nodes further comprises:
    emulating a Layer 2.5 node by broadcasting a plurality of frames each comprising a Well Known MAC Address or a Well Known IP Address upon each virtual local area network (VLAN) and upon each SubNet.

6. The method of claim 1, wherein emulating the plurality of nodes further comprises:
    emulating a Layer 3 or higher node by broadcasting a plurality of frames each comprising a Well Known MAC Address upon each virtual local area network (VLAN), broadcasting a plurality of packets upon each VLAN and each SubNet each packet comprising a Well Known IP Address or a Well Known Port.

7. The method of claim 1, wherein emulating the plurality of nodes further comprises:
    emulating a Fibre Channel storage area network (SAN) node by joining the Fibre Channel fabric and obtaining a domain identifier and sending a Login to non initiator Fibre Channel SAN nodes.

8. The method of claim 1, further comprising:
    logging, with the manager node, information associated with one or more storage devices within a network device map stored within the manager node.

9. The method of claim 1, wherein determining whether to enable the one or more storage devices within the network comprises:
receiving an input by a management application interface that indicates whether to enable the storage devices.

10. A computer program product for Ethernet protocol independent storage device discovery, the computer program product comprising a computer readable storage medium having program instructions embodied therewith, the program instructions readable to cause a manager node to:
emulate a plurality of undiscovered nodes within a network by broadcasting a plurality of data frames according to respective different Ethernet protocols to each of the plurality of undiscovered nodes, each of the plurality of undiscovered nodes operable within the network according to one Ethernet protocol upon being discovered by the manager node;
discover one or more nodes by receiving a reply frame from one or more of the undiscovered nodes;
request from the discovered one or more nodes information associated with one or more storage devices communicatively connected to the discovered one or more nodes; and
determine whether to enable the one or more storage devices within the network.

11. The computer program product of claim 10, wherein the program instructions further cause the manager node to:
log information associated with one or more nodes within a network device map stored within the manager node.

12. The computer program product of claim 10, wherein the program instructions further cause the manager node to:
enable the one or more storage devices within the network; and
map the enabled one or more storage devices to an associated discovered one or more nodes, wherein the mapping allows the associated discovered one or more nodes to utilize the enabled one or more storage devices.

13. The computer program product of claim 10, wherein program instructions for emulating the plurality of nodes further cause the manager node to:
emulate a Layer 1 node by broadcasting a plurality of frames each comprising a Well Known MAC Address upon each virtual local area network (VLAN).

14. The computer program product of claim 10, wherein program instructions for emulating the plurality of nodes further cause the manager node to:
emulate a Layer 2.5 node by broadcasting a plurality of frames each comprising a Well Known MAC Address or a Well Known IP Address upon each virtual local area network (VLAN) and upon each SubNet.

15. The computer program product of claim 10, wherein program instructions for emulating the plurality of nodes further cause the manager node to:
emulate a Layer 3 or higher node by broadcasting a plurality of frames each comprising a Well Known MAC Address upon each virtual local area network (VLAN), broadcasting a plurality of packets upon each VLAN and each SubNet, each packet comprising a Well Known IP Address or a Well Known Port.

16. The computer program product of claim 10, wherein program instructions for emulating the plurality of nodes further cause the manager node to:
emulate a Fibre Channel storage area network (SAN) cloud node by joining the Fibre Channel fabric and obtaining a domain identifier and sending a Login to non initiator Fibre Channel SAN nodes.

17. The computer program product of claim 10, wherein the program instructions further cause the manger node to:
receive an input from a management application interface that indicates whether to enable the storage devices.

18. A data handling network comprising:
a manager node and a plurality of undiscovered nodes communicatively connected to the manager node by a network, each undiscovered node communicatively connected to one or more storage devices and each undiscovered node operable within the network according to one Ethernet protocol upon being discovered by the management node;
wherein the management node emulates the plurality of undiscovered nodes by broadcasting a plurality of data frames according to respective different Ethernet protocols to each of the plurality of undiscovered cloud nodes, discovers one or more of the plurality of undiscovered cloud nodes by receiving a reply frame from one or more of the undiscovered cloud nodes, requests from the discovered one or more nodes information associated with one or more storage devices communicatively connected to the discovered one or more nodes, and determines whether to enable one or more storage devices within the network.

19. The data handling network of claim 18, wherein upon the enablement of the one or more storage devices by the management node, the management node further maps the enabled one or more storage devices to the discovered one or more nodes to allow the discovered one or more nodes to utilize the enabled one or more storage devices as networked storage.

20. The data handling network of claim 18,
wherein the manager node emulates a Layer 1 node by broadcasting a plurality of frames each comprising a Well Known MAC Address upon each virtual local area network (VLAN);
wherein the manager node emulates a Layer 2.5 node by broadcasting a plurality of frames each comprising a Well Known MAC Address or a Well Known IP Address upon each virtual local area network (VLAN) and upon each SubNet;
wherein the manager node emulates a Layer 3 or higher node by broadcasting a plurality of frames each comprising a Well Known MAC Address upon each virtual local area network (VLAN), broadcasting a plurality of packets upon each VLAN and each SubNet each packet comprising a Well Known IP Address or a Well Known Port; and
wherein the manager node emulates a Fibre Channel storage area network (SAN) cloud node by joining the Fibre Channel fabric and obtaining a domain identifier and sending a Login to non initiator Fibre Channel SAN cloud nodes.

* * * * *